United States Patent
Schrauf

(10) Patent No.: US 7,757,994 B2
(45) Date of Patent: Jul. 20, 2010

(54) METHOD AND DEVICE FOR SUCTIONING THE BOUNDARY LAYER

(75) Inventor: Geza Schrauf, Bremen (DE)

(73) Assignee: Airbus Deutschland GmbH, Hamburg (DE)

( * ) Notice: Subject to any disclaimer, the term of this patent is extended or adjusted under 35 U.S.C. 154(b) by 706 days.

(21) Appl. No.: 10/596,912

(22) PCT Filed: Dec. 22, 2004

(86) PCT No.: PCT/EP2004/014617

§ 371 (c)(1),
(2), (4) Date: Apr. 30, 2007

(87) PCT Pub. No.: WO2005/063565

PCT Pub. Date: Jul. 14, 2005

(65) Prior Publication Data

US 2009/0020653 A1    Jan. 22, 2009

(30) Foreign Application Priority Data

Dec. 29, 2003  (DE)  ............................. 103 61 390

(51) Int. Cl.
*B64C 21/06* (2006.01)
(52) U.S. Cl. .................. 244/209; 244/208; 244/118.5
(58) Field of Classification Search ................ 244/204, 244/208, 209, 130, 198, 118.5
See application file for complete search history.

(56) References Cited

U.S. PATENT DOCUMENTS

| | | | |
|---|---|---|---|
| 2,833,492 A | 5/1958 | Fowler | |
| 3,887,147 A | 6/1975 | Grieb | |
| 4,642,997 A | 2/1987 | Krafka | |
| 5,114,103 A | 5/1992 | Coffinberry | |
| 5,884,873 A | 3/1999 | Breit | |
| 6,189,324 B1 | 2/2001 | Williams et al. | |

FOREIGN PATENT DOCUMENTS

| | | |
|---|---|---|
| DE | 4128078 A1 | 3/1992 |
| DE | 19643069 C2 | 3/1999 |
| DE | 19820097 A1 | 11/1999 |
| DE | 19820097 C2 | 2/2003 |

(Continued)

OTHER PUBLICATIONS

G. V. Lachmann, Aspects of Design, Engineering and Operational Economy of Low Drag Aircraft, Boundry Layer and Flow Control—Its Principles and Applications, vol. 2, Pergamon Press, Oxford/ondon, 1961,pp. 1123-1165.

(Continued)

*Primary Examiner*—Tien Dinh
(74) *Attorney, Agent, or Firm*—Christopher Paradies; Fowler White Boggs P.A.

(57) ABSTRACT

A method for suctioning the boundary layer at the surface (1) of an aircraft having an air-conditioning system (4), at whose flow-critical points of the surface multiple suction openings (2) are provided, the air quantity suctioned via these being discharged to the atmosphere again via at least one outlet (7) placed in a way favorable for flow, the air quantity suctioned from the surface (1) being fed to the air-conditioning system (4) of the aircraft, via whose outlet (7) the air quantity suctioned is discharged to the atmosphere together with the exhaust air of the air-conditioning system (4), to reduce flow losses.

8 Claims, 1 Drawing Sheet

FOREIGN PATENT DOCUMENTS

Figure 1:
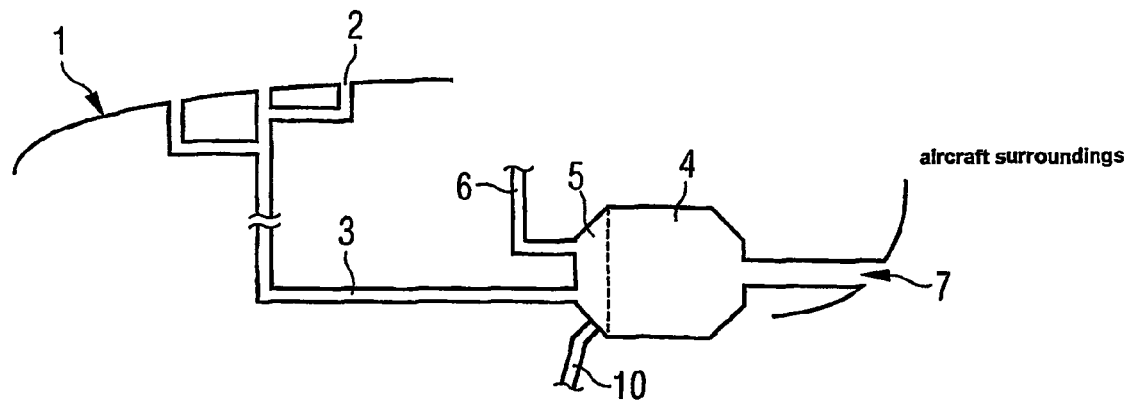

| | | |
|---|---|---|
| EP | 0517459 A1 | 12/1992 |
| EP | 0778199 A2 | 6/1997 |
| RU | 2028963 C1 | 2/1995 |
| RU | 2084377 C1 | 7/1997 |
| WO | 95/19290 A1 | 7/1995 |

OTHER PUBLICATIONS

R. Henke, The Airbus A320 HLF FIN Programme, Novelle revue d'Aeronaitique et d'Astronautique, vol. 209, pp. 53-55.

J.B. Edwards, Fundamental Aspects of Propulsion for Laminar Flow Aircraft, Boundary Layer and Flow Control—Its Principles and Application, vol. 2, Pergamon Press, Oxford/London, 1961, pp. 1077-1122.

W. Pfenninger, Some results from the X21 Programme. Part 1: Flow Phenomena at the Leading Edge of Swept Wings, Recent Developments of Boundary Layer Research, Part IV, Agardograph 97, May 1965.

J.W. Conners, et al., Propulsion Systems for Laminar Flow Aircraft, XP008050510, Aerospace Engineering Aug. 1961, pp. 16, 17, 70-79.

R.E. Kosin, Laminar Flow Control by Suction as Applied to the X-21A Airplane, XP008050509, J. Aircraft, Sep.-Oct. 1965, pp. 384-390.

L.A. Marshall, Summary of Transition Results from the F-16XL-2 Supersonic Laminar Flow Control Experiment, XP-002338570, American Institute of Aeronautics and Astronautics, pp. 1-13.

METHOD AND DEVICE FOR SUCTIONING THE BOUNDARY LAYER

FIELD OF THE INVENTION

The field relates to a method and a device for suctioning air into an air-conditioning system, of an aircraft.

BACKGROUND

In the technical field of airplane construction and in aircraft construction in general, suctioning of the air layer flowing directly along the aerodynamic surface regions of the aircraft, the boundary layer, may be performed to reduce the aerodynamic frictional resistance during flight. This measure is based on the fluidic law that the aerodynamic frictional resistance of laminar boundary layer flows is significantly smaller than that of turbulent boundary layer flows. Therefore, the frictional resistance of an aircraft may be reduced while cruising by keeping the boundary layer flow at wing and tail assembly surfaces at least partially laminar. One method for delaying the change from laminar to turbulent flow comprises suctioning the boundary layer neighboring the surface of the aircraft into the inside of the aircraft using small openings in the external skin of the aircraft forming the surface. Of course, the air suctioned in this way must be released to the outside again, i.e., discharged to the atmosphere, at suitable, flow-favorable points after passing through a special duct system. The bleeding of air from the surface and the equipment necessary to do so add a parasitic weight and energy constraints that offset at least a portion of the benefit realized.

SUMMARY OF THE PRESENT INVENTION

There is a need to keep frictional resistance of an aircraft low, and a system for suctioning air that decreases parasitic and energy constraints is highly desirable.

Shaping and placing the outlet for releasing the air thus suctioned on the aircraft in such a way that as few additional aerodynamic resistances as possible are thus generated may be advantageous. Suitable points are the wing-fuselage transition region of the aircraft or the rear edges of the pylon or the aft fuselage. Analogously, the transition region to the fuselage and the aft fuselage come into consideration for the placement of an outlet of the suction device on tail assemblies. Releasing the suctioned air to the outside through an outlet placed in the region of the cabin window has also already been attempted; however, this solution, which is simple, has not been shown to be favorable to flow.

A disadvantage in principle of all above-mentioned solutions may be that the outlet, as a geometric interference of the aerodynamically shaped surface of the aircraft, always causes losses in the boundary layer flowing past, so that an additional outlet of known devices for suctioning the boundary layer worsens the aerodynamic properties of the aircraft. In order to reduce the resistance generated, the air may be accelerated to a speed which is somewhat above the flow speed at the outlet. Additional energy is necessary for this purpose, which is only partially offset by propulsion generated by the accelerated air.

To reduce flow losses, an air quantity suctioned from the surface and originating from the boundary layer is fed to an air-conditioning system of an aircraft. The air quantity suctioned is discharged to the atmosphere jointly with the exhaust air of the air-conditioning system, such that energy losses are reduced.

A combination of two aircraft systems improves the efficiency of the suctioning of air from critical regions of the aircraft. The two system modules of a modern aircraft which until now functioned completely independently of one another, are brought together. The synergistic effect resulting therefrom is expressed in a reduction of aerodynamic flow losses on the aircraft. This is because by introducing the air of the boundary layer suctioning system into the cabin system, i.e., its air-conditioning system, less bleed air must be taken from the power plant than in the related art, which leads to lower power plant losses. In addition, the total quantity of the exhaust air to be discharged may be reduced, since the air quantity suctioned does not have to be released to the outside in addition to the exhaust air from the air-conditioning system. Therefore, it is believed that no additional flow losses arise through the method according to the present invention for suctioning the boundary layer. Furthermore, flow losses which an otherwise typical additional outlet on the surface of the vehicle would cause may be avoided. Overall, it is believed that a flow-energetics total balance may be improved.

The air quantity suctioned from the boundary layer may be fed to the air mixer unit of the air-conditioning system. Introduction of the air quantity suctioned at this point of the air-conditioning system ensures the two systems, which are coupled to one another, work together optimally. The mixer unit of the air-conditioning system of an aircraft is located behind the air-conditioning pack in most cases and combines air partially originating from the recirculation of used cabin air with bleed air taken from the power plant.

The air quantity suctioned is to be fed to a duct which is connected to the fresh air outlets of the air-conditioning system (on the unpressurized side) and a check valve, a connection existing between the latter and the mixer unit.

However, it may be considered that this suctioned air quantity may be brought to a pressure suitable to be fed into the cabin system, i.e., to cabin pressure, at a suitable point of the duct system before introduction into the pressurized region of the aircraft fuselage. A compression unit may be introduced into the duct system for this purpose, if necessary.

The air quantity suctioned may be adjusted suitably in regard to temperature and humidity by the air-conditioning system, so that no further technical means are necessary for this purpose.

DETAILED DESCRIPTION OF EXEMPLARY EMBODIMENTS

Further measures and features of exemplary embodiments of the present invention will be explained in greater detail in the following on the basis of the figures, together with the description of a preferred exemplary embodiment of the present invention.

Figure 2:
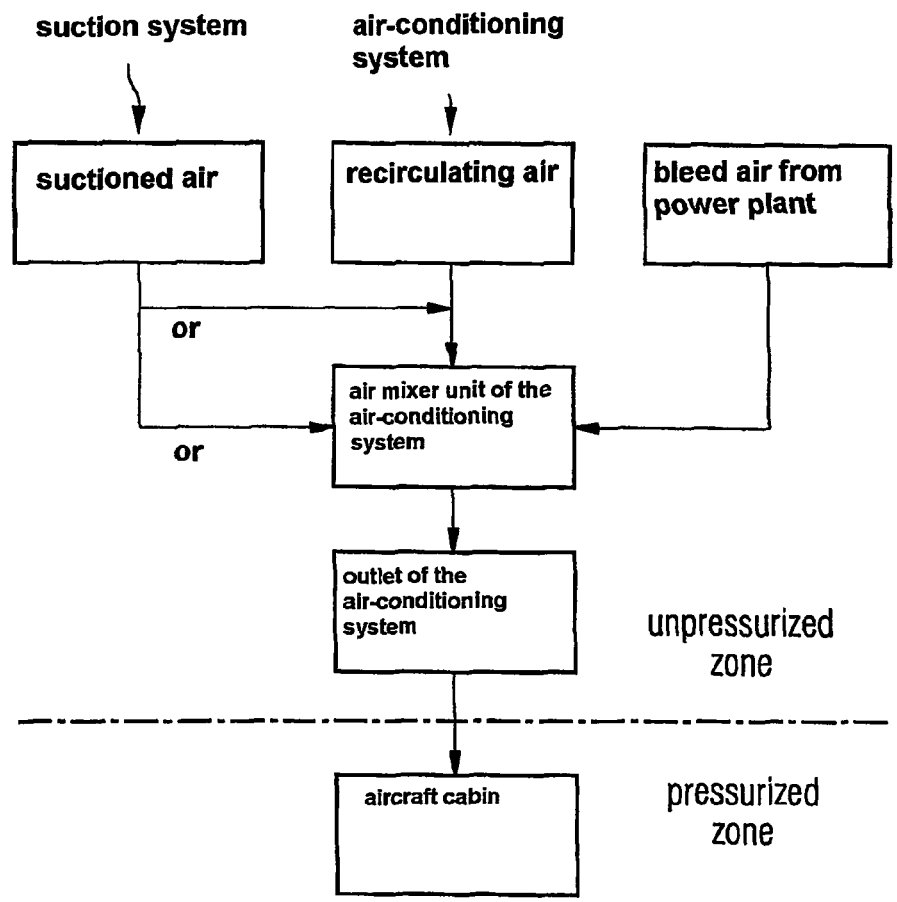

FIG. 1 shows a schematic illustration of a device for suctioning the boundary layer at the surface of an aircraft, and FIG. 2 shows a schematic flowchart illustration of the suctioning method executable using the device from FIG. 1.

According to FIG. 1, the surface 1 of an aircraft is provided with many small suction openings 2. The suction openings 2 are positioned at flow-critical points of the surface 1 (shown purely schematically here). During flight, the air flow runs along the surface 1, the air layer proximal to the surface being referred to as the boundary layer. In order to keep this layer laminar even at a high flow speed, the boundary layer is suctioned through the suction openings 2. The suction openings 2 are connected to a continuing duct system 3. The suction effect in the duct system 3 is generated via a suction source (not shown here in greater detail). The duct system 3 discharges into an air-conditioning system 4 of the aircraft.

The air-conditioning system 4 is used for climate control of the aircraft cabin. The entry of the duct system 3 into the air-conditioning system 4 occurs via its air mixer unit 5. In addition, a recirculation line 6 is also connected at the intake side of the air mixer unit 5. The recirculation line 6 is used to return a part of the cabin air into the air-conditioning system in order to adjust the temperature and humidity again. The exhaust air of the air-conditioning system 4 reaches the atmosphere via an outlet 7. The outlet 7 of the air-conditioning system 4 is positioned on the aircraft for optimal flow, preferably in the lower aft section. In addition, the part of the suctioned air quantity originating from the duct system 3 also exits via the outlet 7. Bleed air may be fed to the air-conditioning system from the power plant (jet engine, turbofan, engine, etc.) via a bleed air access 10.

According to FIG. 2, the suction system for suctioning the boundary layer is thus coupled to the air-conditioning system for climate control of the cabin of the aircraft. The recirculating air of the air-conditioning system, the suctioned air of the suction system, and bleed air from the power plant reach the air-conditioning system via the air mixer unit and leave the air-conditioning system together from its outlet to be carried away at the atmosphere. The suctioned air may accordingly be fed to the recirculating air or directly to the air mixer unit of the air-conditioning system. The suctioned air may also be fed simultaneously to the recirculating air system and the air mixer unit.

In this way, aerodynamic flow losses are minimized by saving a separate outlet for the suction system. Furthermore, the air-conditioning system derives a part of the fresh air from the suction system, so that less bleed air needs to be taken from the power plant, which leads to lower power plant losses. In this way, the total quantity of exhaust air to be discharged is reduced.

As noted above, a delay of the change from laminar to turbulent flow may be generated by (1) shaping of the aircraft (suitable pressure gradient along the external surface), or (2) suctioning of the boundary layer, or (3) cooling of the surface in the event of air currents (heating of the surface in event of water currents).

As may also be inferred from FIG. 2, the systems for the suctioned air, the recirculated air, the bleed air, the air mixer unit, and the outlet of the air-conditioning system are positioned in the unpressurized zone without artificial pressure. Of course, there is a "pressurized" zone in the aircraft cabin.

The HLFC method (HLFC=hybrid laminar flow control) is advantageously applied, which is a combination of (1) and (2). For example, (2) may be applied at the wing (tail assembly) front edge and (1) over the wing boxes, for example, since the space in the wing boxes is used as tank volume. Small openings are provided in the surface of the aircraft for the boundary layer suctioning, which may have dimensions in the micrometer range.

As already noted above, according to one exemplary embodiment of the present invention, a suctioned air quantity is fed to the air-conditioning system of the aircraft. The air quantity is then discharged to the atmosphere together with the exhaust air of the air-conditioning system via the outlet of the air-conditioning system. In this way, an outlet for the suctioned air may be saved, which may reduce a resistance of the aircraft.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

What is claimed is:

1. A method for suctioning a boundary layer at a surface of an aircraft having an air-conditioning system, the air conditioning system having an air mixer unit, for supplying a pressurized aircraft cabin with conditioned air, and at flow-critical points of the surface, the surface has multiple suction openings provided for boundary layer suctioning of suction air, the method comprising the steps of:

feeding a quantity of the suction air to the air mixer unit of the air-conditioning system of the aircraft to reduce flow losses; and feeding a portion of the cabin air to the air mixer unit such that the portion of the cabin air is returned into the air-conditioning system via the mixer unit and is mixed with the quantity of the suction air to form a mixture prior to discharging the mixture to the cabin.

2. The method of claim 1, further comprising the step of:

feeding the quantity of the suction air to a line connection assigned to an unpressurized line region without artificial pressure.

3. The method of claim 1, further comprising the step of:

bringing the quantity of the suction air to cabin pressure before introducing the quantity of the suction air into the aircraft cabin.

4. The method of claim 1, further comprising the step of:

adjusting at least one of a temperature and a humidity of the suction air in the air-conditioning system.

5. A device for suctioning and treating suction air from a boundary layer at a surface of an aircraft having an air-conditioning system for conditioning cabin air of a pressurized cabin of the aircraft, the device comprising:

openings positioned at flow-critical points of the surface;

a recirculation line;

a duct system; and an air mixer unit, wherein the duct system couples the air mixer unit and the openings and feeds the suction air from the openings of the surface of the aircraft to the air mixer unit, and the recirculation line is coupled to the air mixer unit, such that a portion of cabin air is returned to the mixer unit from the cabin of the aircraft adjusting temperature and humidity of a mixture including the suction air and the portion of cabin air prior to the discharge of the mixture into the cabin.

6. The device of claim 5, further comprising:

a compression unit into the duct system such that the suction air is brought to cabin pressure by the compression unit before introduction of the suction air into the air mixer unit of the air-conditioning system.

7. The device of claim 5, wherein the openings are positioned in a flow-critical region of a wing assembly surface or a tail assembly surface.

8. The device of claim 5, further comprising:

a suction source;

wherein the duct system is connected to the suction source for generating a suction effect required for the suctioning.

* * * * *